United States Patent [19]
Wedenig

[11] Patent Number: 5,906,464
[45] Date of Patent: May 25, 1999

[54] QUICK-CLAMPING NUT FOR A FASTENER ASSEMBLY

[75] Inventor: Harald Wedenig, St. Marein/Mürztal, Austria

[73] Assignee: HKT Haider und Deravis GmbH, Vienna, Austria

[21] Appl. No.: 08/562,033

[22] Filed: Nov. 22, 1995

[51] Int. Cl.⁶ .................................................. F16B 37/08
[52] U.S. Cl. ........................ 411/433; 411/437; 411/525
[58] Field of Search ............................ 411/433, 437, 411/527, 525, 526

[56]  References Cited

U.S. PATENT DOCUMENTS

| | | | |
|---|---|---|---|
| 4,299,520 | 11/1981 | Iwata | 411/437 |
| 4,728,236 | 3/1988 | Kraus | 411/525 |
| 4,828,444 | 5/1989 | Oshida | 411/437 |
| 4,936,066 | 6/1990 | Riitsche et al. | 411/508 |
| 4,990,044 | 2/1991 | Kimak | 411/437 |
| 4,999,019 | 3/1991 | Kraus | 411/437 |
| 5,098,242 | 3/1992 | Schaty | 411/437 |
| 5,292,217 | 3/1994 | Kospi | 411/437 |
| 5,297,322 | 3/1994 | Kraus | 411/508 |
| 5,302,070 | 4/1994 | Kaneyama et al. | 411/437 |
| 5,423,647 | 6/1995 | Suzuki | 411/433 |

*Primary Examiner*—Kenneth J. Dorner
*Assistant Examiner*—Fredrick Conley
*Attorney, Agent, or Firm*—Herbert L. Lerner; Laurence A. Greenberg; Werner H. Stemer

[57]  ABSTRACT

A quick-clamping nut for a fastener assembly with mutually cooperating threaded bolts and nuts. The nut is a circular-cylindrical or prismatic hollow body of hard-elastic material, in particular plastic. A protrusion, which is integrally formed with the nut body, projects from the inner wall of the hollow body and it is oriented obliquely towards the axis. The free end of the projection cooperates with the thread of the bolt such that the threaded bolt is axially displaceable in one direction relative to the nut, causing elastic deformation of the protrusion. In the other direction, the is locked, but it is threadable similarly to a conventional, rigid nut and a force can be transmitted in the axial direction between the threaded bolt and the nut The protrusion is formed with an axial extension, which extends to approximately the plane of the contacting surface of the nut with the component to be clamped in the fastener assembly.

18 Claims, 1 Drawing Sheet

FIG.1
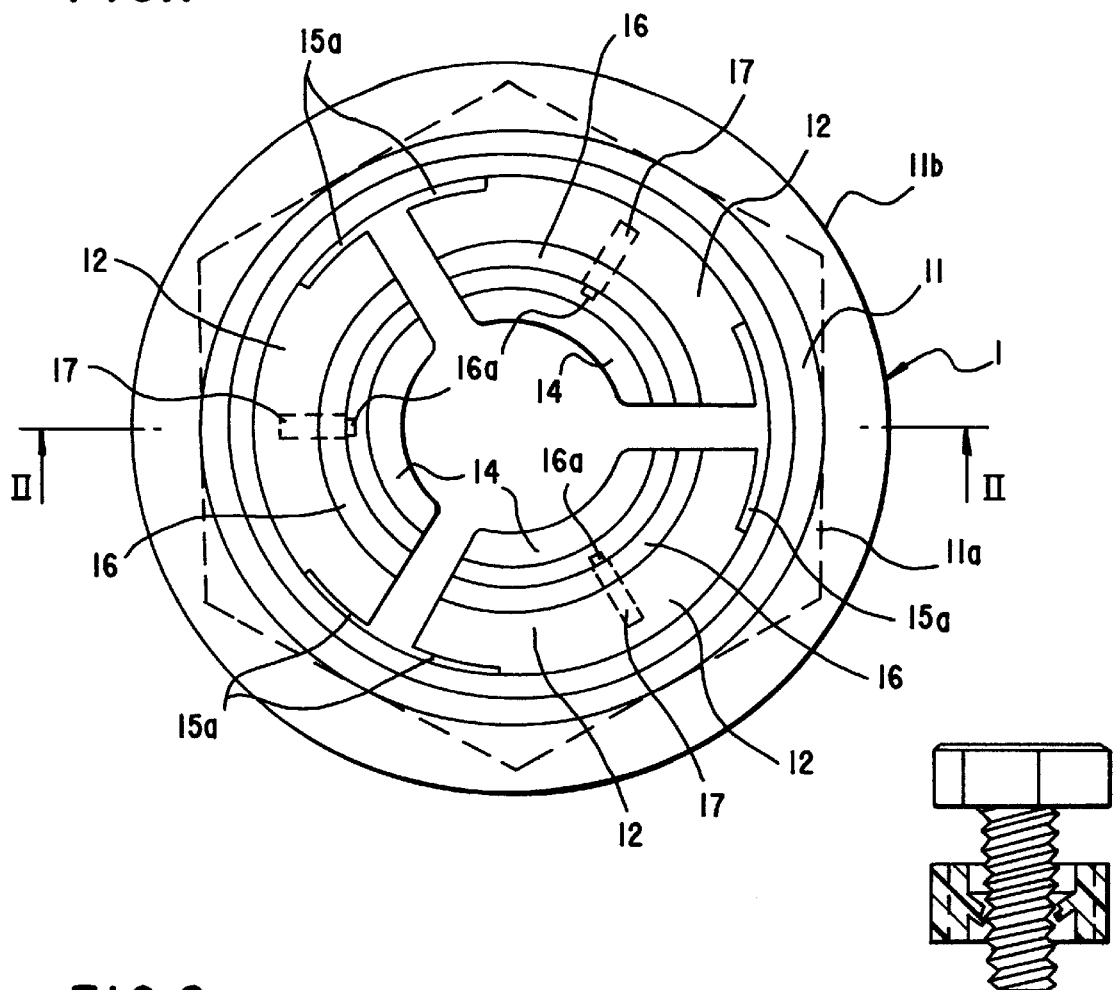
FIG.2
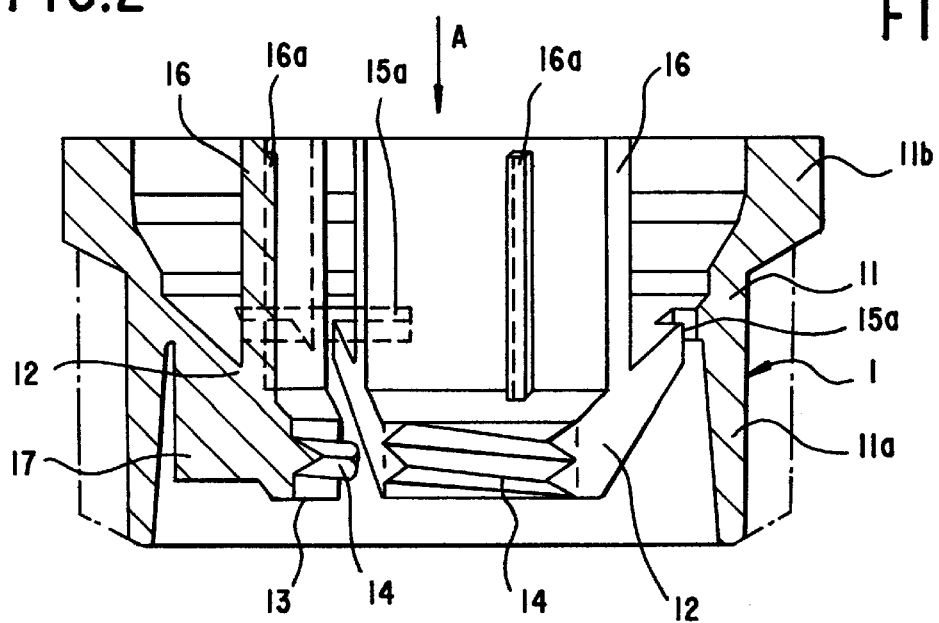
FIG.3

QUICK-CLAMPING NUT FOR A FASTENER ASSEMBLY

BACKGROUND OF THE INVENTION

Field of the Invention

The invention relates to a nut for a fastener assembly (fastener), which comprises a bolt formed with a thread and a nut cooperating with the bolt, and which is a circular-cylindrical or prismatic hollow body made of hard-elastic material, in particular plastic, from whose inner wall at least one protrusion oriented obliquely towards the axis and integral with the hollow body protrudes inward, the free end whereof cooperates with the thread of the bolt, as a result of which the threaded bolt is axially displaceable in one direction relative to the nut, causing elastic deformation of the at least one protrusion, on the one hand and on the other is rotatable relative to the nut, and a force can be transmitted in the axial direction between the threaded bolt and the nut.

Prior art nuts of such fastening assemblies do not meet requirements in the sense that they have a multitude of components, which means that on the one hand they are very expensive to manufacture and on the other hand their functional reliability is not assured. In such nuts it is further necessary to embody the at least one protrusion as elastically resilient, to allow moving the threaded bolts past it. That elasticity, however, greatly reduces the holding force or axial retention of the protrusion.

SUMMARY OF THE INVENTION

It is accordingly an object of the invention to provide a nut and a fastener assembly with a quick-clamping nut, which overcomes the above-mentioned disadvantages of the previously known devices of this general type and which comprises as few components as possible, thus making it inexpensive to manufacture, while assuring superior axial retention regardless of the elasticity of the at least one protrusion.

With the foregoing and other objects in view there is provided, in accordance with the invention, a quick-clamping nut for a fastener assembly with a threaded bolt, comprising:

a hollow nut body of hard-elastic material formed with an opening for receiving a threaded bolt therein, the nut body having a contact surface for contacting a component surface to be clamped with the fastener assembly, the hollow nut body defining an axis and having an inner wall defining the opening, at least one protrusion projecting obliquely inwardly from the inner wall and being formed integrally with the hollow nut body, the protrusion having a free end for cooperating with the threaded bolt such that the threaded bolt is axially shiftable in one direction relative to the nut body, whereby the protrusion is elastically deformed, while being locked against shifting in the opposite direction, and an axially projecting extension formed on the at least one protrusion, the axially projecting extension approximately extending to the contact surface of the nut body.

In accordance with another feature of the invention, the body is one of a circular-cylindrical or prismatic hollow body.

In other words, the objects of the invention are solved in that the at least one protrusion is embodied with an axially projecting extension which extends to approximately the plane of the surface of the nut which contacts the contacting component.

Preferably, the at least one protrusion is also embodied with at least one radially protruding extension each, which limits the bending of the protrusion away from the center axis by coming into contact with the inner wall of the hollow body. Furthermore, the extension may be embodied on its inside with a protrusion, in particular an axially extending rib, by which the screw bolt is guided. The protrusion can form an angle of from 10° to 50°, in particular an angle of approximately 30°, with the axis of the hollow body. The at least one protrusion can be formed on its free end with a rib which defines a portion of a thread. Accordingly, another feature of the invention defines the free end of the at least one protrusion as a rib defining a portion of a thread for cooperating with the threaded bolt. The free end of the at least one protrusion thereby extends along a helical line.

In accordance with an added, defined feature of the invention, the hard-elastic material is plastic material. The material may be selected from the group consisting of a thermoplastic material, an elastomer material, a duromer material, a fiber-reinforced plastic, a particle-reinforced polymer material, and a particle and fiber-reinforced polymer material In the case of fiber-reinforced materials, the reinforcing fibers are oriented exclusively or predominantly in the axial direction.

In accordance with another feature of the invention, the axially projecting extension is formed with an inner guide for guiding the threaded bolt during an axial shifting thereof. The inner guide is preferably an axially extending rib.

In accordance with a further feature of the invention, the at least one protrusion is a portion of a multiply-divided conical ring.

In accordance with again a further feature of the invention, the protrusion has a given wall thickness and a given thickness of its connection with the inner walls the given wall thickness being markedly less than the thickness of the connection, and preferably approximately half the given wall thickness.

In accordance with again an additional feature of the invention, the at least one protrusion is one of a plurality of protrusions, and the nut body includes a strip joining the free ends of the plurality of protrusions together and being interrupted at one point.

With the above objects in view there is also provided, in accordance with the invention, a fastener assembly which comprises: a bolt with a thread, and a nut, the nut having a nut body formed with a bore defining an axis and being adapted to receive therein the bolt, and at least one protrusion oriented obliquely to the axis, the at least one protrusion being formed integrally with the nut body and extending inwardly from an inner wall of the bore, the at least one protrusion having a free end cooperating with the thread of the bolt, such that the bolt is axially shiftable relative to the nut in one direction and causing elastic deformation of the at least one protrusion, and the protrusion forming a detent for axially locking the nut and the bolt in the opposite direction while allowing a rotation of the bolt relative to the nut for transmitting an axial force between the bolt and the nut, the nut body further defining a clamping surface for contacting a workpiece, and the at least one protrusion being formed with an axially projecting extension which extends to approximately the clamping surface of the nut body.

In accordance with a concomitant feature of the invention, the at least one protrusion is one of a plurality of protrusions together defining a conical ring defining the detent for axially locking the bolt and the nut.

Other features which are considered as characteristic for the invention are set forth in the appended claims.

Although the invention is illustrated and described herein as embodied in a nut for a fastener and a fastener assembly with a quick-clamping nut, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 1 is a plan axial view of a preferred embodiment of a nut according to the invention;

FIG. 2 is a diametric section thereof taken along the line II—II of FIG. 1; and

FIG. 3 is a partly sectional view of the principle cooperation of a bolt and a nut.

DESCRIPTION OF THE PREFERRED EMBODIMENTS

Referring now to the figures of the drawing in detail, the nut 1 of the drawing comprises a sleeve 11, whose outer jacket 11a is embodied as a hexagon. On one of its edges, the sleeve 11 is embodied as a knurled screw 11b. Three protrusions 12 protrude from the inner wall of the sleeve 11 and together make up a conical ring. The protrusions 12 are embodied with ribs 14 on the free ends 13 thereof, which form parts of an internal thread.

The protrusions 12 carry upwardly-projecting extensions 16, serving the purpose of support and extending approximately in the circumferential direction, and with outward protruding extension 17, oriented approximately radially and serving to limit the (radially) outward bending of the protrusions 12. Ribs 16a, which serve to guide the screw bolts, are also provided on the inside of the extensions 16. The at least one protrusion 12 and the axis of the hollow body 11 form an angle between 10° and 50°, and in particular an angle of approximately 30°.

Since the connections of the protrusions 12 with the inner wall of the sleeve 11 are formed with slits 15a, the requisite elasticity of the protrusions 12 is assured in order to bring about the detent engagement of the ribs 14, corresponding to the nut thread, with the threaded bolt that is inserted into the nut. In addition, the wall thickness of where the at least one protrusion 12 is bound to the bolt may be markedly less than the wall thickness of the protrusion, and in particular is approximately half the wall thickness thereof.

It will be appreciated that the functionality of the invention is assured with the radially inner components of the nut. Accordingly, a nut of the invention may also be an integral component of a structural element. It need not be embodied as a circular-cylindrical or prismatic hollow body but instead is embodied merely with an inner wall from which at least one conically tapering and possibly multiple-part protrusion projects, whose free end cooperates with a screw bolt or similar thread.

Such a nut may be made from a thermoplastic material, an elastomer material, a duromeric material, a fiber-reinforced plastic, a particle-reinforced polymer material, or a particle- and/or fiber-reinforced polymer material. The fibers may be disposed so that they extend exclusively or largely in the axial direction.

The usage is such that a screw bolt is inserted in the direction of the arrow A. Since the protrusions 12 yield elastically away from one another (the nut thread expands radially), the screw bolt can be moved past the ribs 15 until it comes to rest on the particular component that is to be fastened The ribs 14, which define the nut thread, thereupon lock in detent fashion into the thread of the screw bolt. The quick-clamping axial sliding movement thus allows the nut to be moved onto the bolt until the distance between the contacting surface of the sleeve 11 (at 11b) and the bolt head essentially corresponds to the thickness of the workpieces to be clamped by the fastener assembly. At that point the screw bolt, or the nut for that matter, is rotated by only a relatively small angle of rotation (usually less than a full rotation) and the workpieces are rigidly clamped. Since a support of the protrusions 12 is brought about by the axial extension 16, the nut exhibits a very high axial retention force, or in other words a very strong holding force.

The protrusions 12 are preferably joined together on their free ends by a continuous strip. Once the nut is used, this strip is broken. As a result, it is obvious at any time whether the nut is new or has already been used.

A fastener assembly may comprise a bolt and a nut, the bolt being embodied with a thread, wherein the nut is formed by a main body with a bore At least one protrusion is oriented obliquely to the axis. More particularly, a conical ring that is integral with the component, projects radially inwardly from the inner wall of the bore. The free end of the protrusion cooperates with the thread of the bolt, as a result of which the screw bolt is axially displaceable in one direction relative to the nut causing elastic deformation of the detent element, and is rotatable relative to the nut. As a result, a force can be transmitted in the axial direction between the screw bolt and the nut. Furthermore, the at least one protrusion may be provided with an axially protruding extension that extends to approximately the plane of the surface of contact of the nut with the contacting component.

With reference to FIG. 3, the nut 1 is relatively easily slipped onto a bolt 18. The oblique orientation of the protrusions 12 thereby ensures that the nut cannot slip from the threaded bolt 18.

I claim:

1. A quick-clamping nut for a fastener assembly with a threaded bolt, comprising: a hollow nut body of hard-elastic material formed with an opening for receiving a threaded bolt therein, said nut body having a contact surface defining a plane for contacting a component surface to be clamped with the fastener assembly, said hollow nut body defining an axis and having an inner wall defining said opening, at least one protrusion projecting obliquely inwardly from said inner wall of said hollow nut body, said protrusion having a free end for cooperating with the threaded bolt such that the threaded bolt is axially shiftable in one direction relative to said nut body, whereby said protrusion is elastically deformed, while being locked against shifting in the opposite direction, and an axially projecting extension formed within said hollow nut body and on said at least one protrusion for supporting said at least one protrusion against the component surface, said axially projecting extension being axially shiftable relative to and independently of said inner wall of said hollow nut body and extending to the plane of the contact surface of said nut body.

2. The nut according to claim 1, wherein said body is one of a circular-cylindrical and prismatic hollow body.

3. The nut according to claim 1, wherein said hard-elastic material is plastic material.

4. The nut according to claim 1 which further comprises a radially projecting extension formed on said at least one protrusion defining means for limiting bending of said protrusion towards said inner wall of said nut body.

5. The nut according to claim 1, wherein said axially projecting extension is formed with an inner guide for guiding the threaded bolt during an axial shifting thereof.

6. The nut according to claim 5, wherein said inner guide is an axially extending rib.

7. The nut according to claim 1, wherein said at least one protrusion is a portion of a multiply-divided conical ring.

8. The nut according to claim 1, where said at least one protrusion encloses an angle of from 10° to 50° with the axis of said hollow nut body.

9. The nut according to claim 1, where said at least one protrusion encloses an angle of approximately 30° with the axis of said hollow nut body.

10. The nut according to claim 1, wherein said free end of said at least one protrusion is formed with a rib defining a portion of a thread for cooperating with the threaded bolt.

11. The nut according to claim 1, wherein said free end of the at least one protrusion extends along a helical line.

12. The nut according to claim 1, wherein said at least one protrusion has a given wall thickness and a given thickness of its connection with the inner wall, said given wall thickness being markedly less than the thickness of the connection.

13. The nut according to claim 12, wherein the thickness of the connection is approximately twice the given wall thickness.

14. The nut according to claim 1, wherein said at least one protrusion is one of a plurality of protrusions.

15. The nut according to claim 1, wherein said hollow nut body is made of a plastic selected from the group consisting of a thermoplastic material, an elastomer material, a duromer material, a fiber-reinforced plastic, a particle-reinforced polymer material, and a particle and fiber-reinforced polymer material.

16. The nut according to claim 1, wherein said hollow nut body is made of a fiber-reinforced plastic material, with reinforcing fibers being oriented exclusively or preferentially in the axial direction.

17. A fastener assembly, comprising: a bolt with a thread, and a nut, said nut having a nut body formed with a bore defining an axis and being adapted to receive therein said bolt, and at least one protrusion oriented obliquely to the axis, said at least one protrusion extending inwardly from an inner wall of said bore, said at least one protrusion having a free end cooperating with said thread of said bolt, such that said bolt is axially shiftable relative to said nut in one direction and causing elastic deformation of said at least one protrusion, and said protrusion forming a detent for axially locking said nut and said bolt in the opposite direction while allowing a rotation of said bolt relative to said nut for transmitting an axial force between said bolt and said nut, said nut body further defining a clamping surface defining a plane for contacting a workpiece, and said at least one protrusion being formed with an axially projecting extension which supports said at least one protrusion on the workpiece, said axially projecting extension being axially shiftable relative to and independently of said inner wall of said bore and extending to the plane of the clamping surface of said nut body.

18. The fastener assembly according to claim 17, wherein said at least one protrusion is one of a plurality of protrusions together defining a conical ring defining said detent for axially locking said bolt and said nut.

\* \* \* \* \*